(12) United States Patent
Acosta et al.

(10) Patent No.: US 9,535,242 B1
(45) Date of Patent: Jan. 3, 2017

(54) PARALLEL PROGRAMMABLE ARRAY MICROSCOPE

(71) Applicant: VERILY LIFE SCIENCES LLC, Mountain View, CA (US)

(72) Inventors: Victor M. Acosta, San Francisco, CA (US); Vidya Ganapati, Berkeley, CA (US)

(73) Assignee: Verily Life Sciences LLC, Mountain View, CA (US)

( * ) Notice: Subject to any disclaimer, the term of this patent is extended or adjusted under 35 U.S.C. 154(b) by 157 days.

(21) Appl. No.: 14/316,620

(22) Filed: Jun. 26, 2014

(51) Int. Cl.
*G02B 21/06* (2006.01)

(52) U.S. Cl.
CPC .................... *G02B 21/06* (2013.01)

(58) Field of Classification Search
CPC ... G02B 21/248; G02B 21/241; G02B 21/025; G02B 21/06; G02B 21/26; G02B 21/34; G02B 21/00; G01N 21/64
USPC .................................................. 359/380–396
See application file for complete search history.

(56) References Cited

U.S. PATENT DOCUMENTS

| | | | |
|---|---|---|---|
| 3,013,467 A | 12/1961 | Minsky | |
| 5,587,832 A * | 12/1996 | Krause | G02B 21/004 250/216 |
| 6,038,067 A | 3/2000 | George | |
| 6,399,935 B1 * | 6/2002 | Jovin | G02B 21/0032 250/216 |
| 7,277,566 B2 | 10/2007 | Miyawaki et al. | |
| 7,460,248 B2 | 12/2008 | Kurtz et al. | |
| 7,706,584 B2 | 4/2010 | Saggau et al. | |
| 2013/0157376 A1 * | 6/2013 | Nay | B01L 3/50851 436/94 |

FOREIGN PATENT DOCUMENTS

DE     102012009836 A1 *  11/2013  ......... G02B 21/0028

OTHER PUBLICATIONS

Martial, Franck P. et al., "Programmable Illumination and High-Speed, Multi-Wavelength, Confocal Microscopy Using a Digital Micromirror", Plos One, vol. 7, Issue 8, e43942, Aug. 2012, 9 pages.
Hung, Chuan-Cheng et al., "Optical design of automotive headlight system incorporating digital micromirror device", Applied Optics, vol. 49, No. 22, Aug. 1, 2010, pp. 4182-4187.
Verveer, P.J. et al., "Theory of confocal fluorescence imaging in the programmable array microscope (PAM)", Journal of Microscopy, vol. 189, Pt. 3, Mar. 1988, pp. 192-198.
(Continued)

*Primary Examiner* — Stephone B Allen
*Assistant Examiner* — Rahman Abdur
(74) *Attorney, Agent, or Firm* — Blakely Sokoloff Taylor & Zafman LLP (57) ABSTRACT

A microscope system includes a sample tray to hold a plurality of samples to be imaged in parallel. An illumination source generates illumination light and a plurality of spatial light modulators are each positioned to spatially modulate the illumination light onto a corresponding one of the samples. Relay optics are positioned in an optical path between the sample tray and the plurality of spatial light modulators to image the samples onto the plurality of spatial light modulators. A plurality of first cameras is positioned to capture images in parallel of the samples in the sample tray by imaging the plurality of spatial light modulators.

19 Claims, 5 Drawing Sheets

(56) References Cited

OTHER PUBLICATIONS

Liang, M. et al., "Confocal pattern period in multiple-aperture confocal imaging systems with coherent illumination", Optics Letters, vol. 22, No. 11, Jun. 1, 1997, pp. 751-753.
Fluorescence microscope, From Wikipedia, the free encyclopedia, http://en.wikipedia.org, Last accessed Apr. 23, 2014, 8 pages.
Confocal microscopy, From Wikipedia, the free encyclopedia, http://en.wikipedia.org, Last accessed Apr. 23, 2014, 3 pages.
Yokogawa, User's Manual, Confocal Scanner Unit CSU-X1, IM 85A7C25-02E, $1^{st}$ Edition, Yokogawa Electric Corporation, prior to Jun. 25, 2014, 75 pages.
Yokogawa, User's Manual, CSU Control Unit CSUX1CU, IM 85A7C26-02E, $1^{st}$ Edition, Yokogawa Electric Corporation, prior to Jun. 25, 2014, 36 pages.
Yokogawa, User's Manual, Filter Wheel—CSUX1FW, IM 85A7C27-01E, $1^{st}$ Edition, Yokogawa Electric Corporation, prior to Jun. 25, 2014, 24 pages.
Members, Current Projects, University of Leicester, funded by BBSRC, http://www2.le.ac.uk/Members/nh88/current-projects, Last accessed May 2, 2014, 2 pages.
Lab. Cellular Dynamics, Research Subjects: Programmable Array Microscope, High-speed, optical sectioning microscope with single molecule sensitivity. http://www3.mpibpc.mpg.de/groups/jovin/index.php/ResearchSubjects/PAM, Last accessed May 5, 2014, 2 pages.
Zeiss, Education in Microscopy and Digital Imaging, Yokogawa Spinning Disk Scanning Unit, http://zeiss.magnet.fsu.edu/tutorials/spinningdisk/yokogawa/indexflash.html, Last accessed May 2, 2014, 4 pages.

\* cited by examiner

POINT SPREAD FUNCTION IMAGING

FIG. 5F

PARALLEL PROGRAMMABLE ARRAY MICROSCOPE

TECHNICAL FIELD

This disclosure relates generally to microscopes, and in particular but not exclusively, relates to confocal microscopes.

BACKGROUND INFORMATION

Figure 1A:
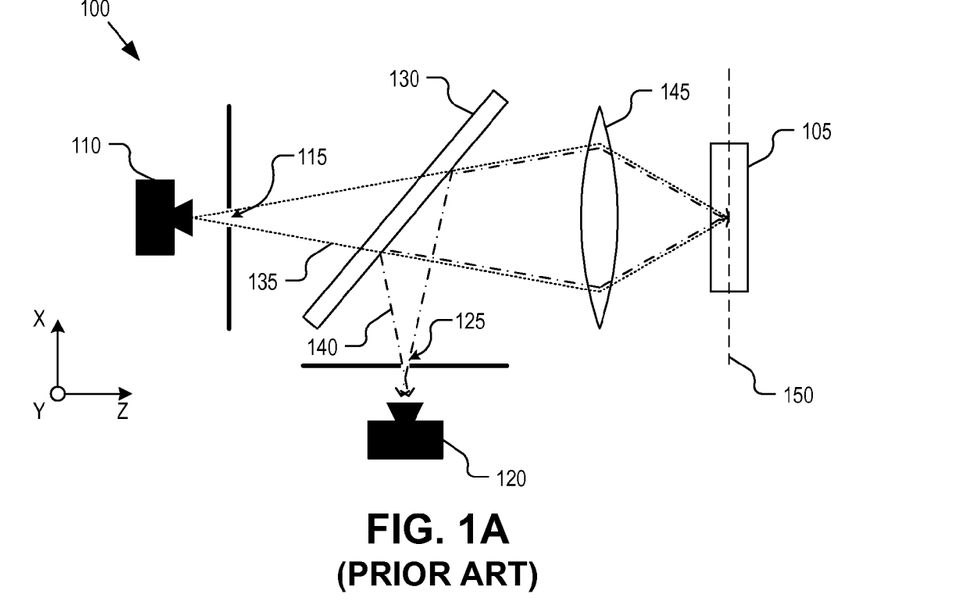
FIG. 1A (PRIOR ART) illustrates a conventional confocal microscope.

Confocal microscopy is an imaging technique that increases optical resolution and contrast using point illumination and pinholes to eliminate out-of-focus light in a specimen. FIG. 1A illustrates a convention confocal microscope 100. As illustrated, a sample 105 is illuminated using light source 110 through a pinhole 115. A lens 145 focuses illumination light 135 to a point on focal plane 150 passing through sample 105. Sample 105 is scanned in both lateral dimensions (X and Y) as well as the axial direction (Z), and the resulting image, acquired at camera 120 through pinhole 125, is a three-dimensional ("3D") image. A beam splitter 130 is often used to pass the illumination light 135 to sample 105 while redirecting the reflected light 140 to camera 120. This type of sequential voxel-by-voxel scanning is slow and not suitable for large longitudinal studies and real time imaging. State-of-the-art confocal microscopes today use a spinning disk of pinholes, which increases throughput. However spinning disks are mechanically cumbersome and require a large form factor, limiting parallelization and scalability. If the throughput of confocal microscopy systems could increase by orders of magnitude, new paradigms in screening could be opened.

Figure 1B:
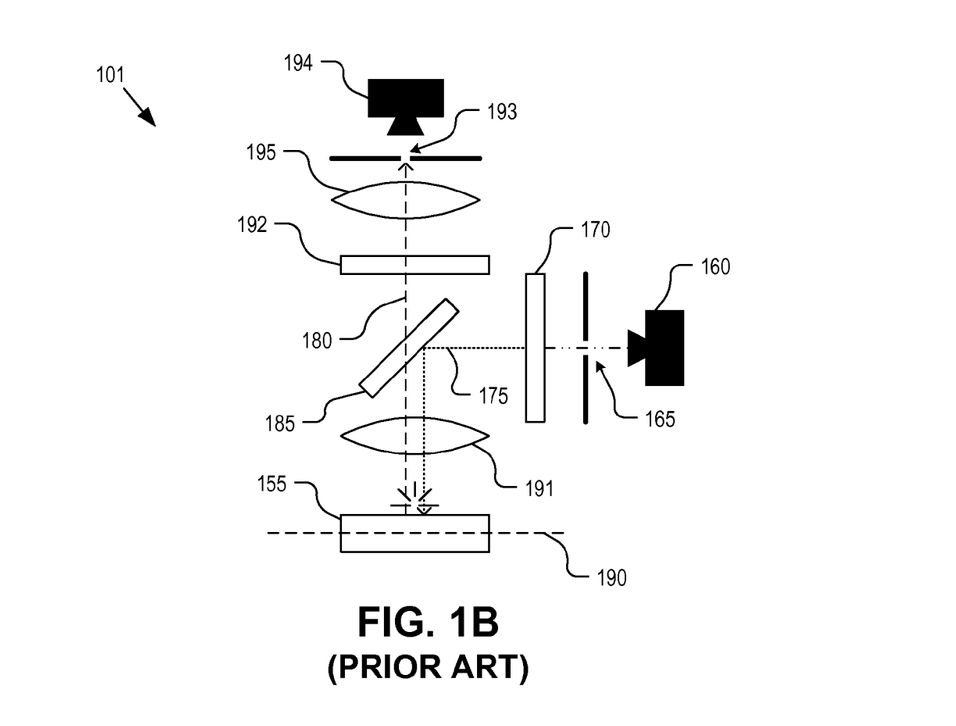
FIG. 1B (PRIOR ART) illustrates a conventional confocal fluorescence microscope.

Confocal microscopy can be extended for use with fluorescence microscopes. A fluorescence microscope is a microscope that uses fluorescence or phosphorescence to image samples. FIG. 1B illustrates a conventional confocal fluorescence microscope 101 where a sample 155 is illuminated by an illumination source 160 through a pinhole 165. An excitation filter 170 limits the wavelength of the excitation light 175, which excites sample 155 to emit fluorescent light 180. The excitation light 175 is redirected by dichroic mirror 185 and focused onto focal plane 190 by objective lens 191. Fluorescent light 180 passes back through dichroic mirror 185, filtered by emission filter 192 to block undesirable wavelengths, and focused through pinhole 193 onto camera 194 by ocular lens 195. To achieve 3D images, sequential voxel-by-voxel scanning is used, which is slow and not suitable for longitudinal studies and real time imaging.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. The drawings are not necessarily to scale, emphasis instead being placed upon illustrating the principles being described.

DETAILED DESCRIPTION

Embodiments of a system, apparatus, and method of operation for a microscope system are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 2:
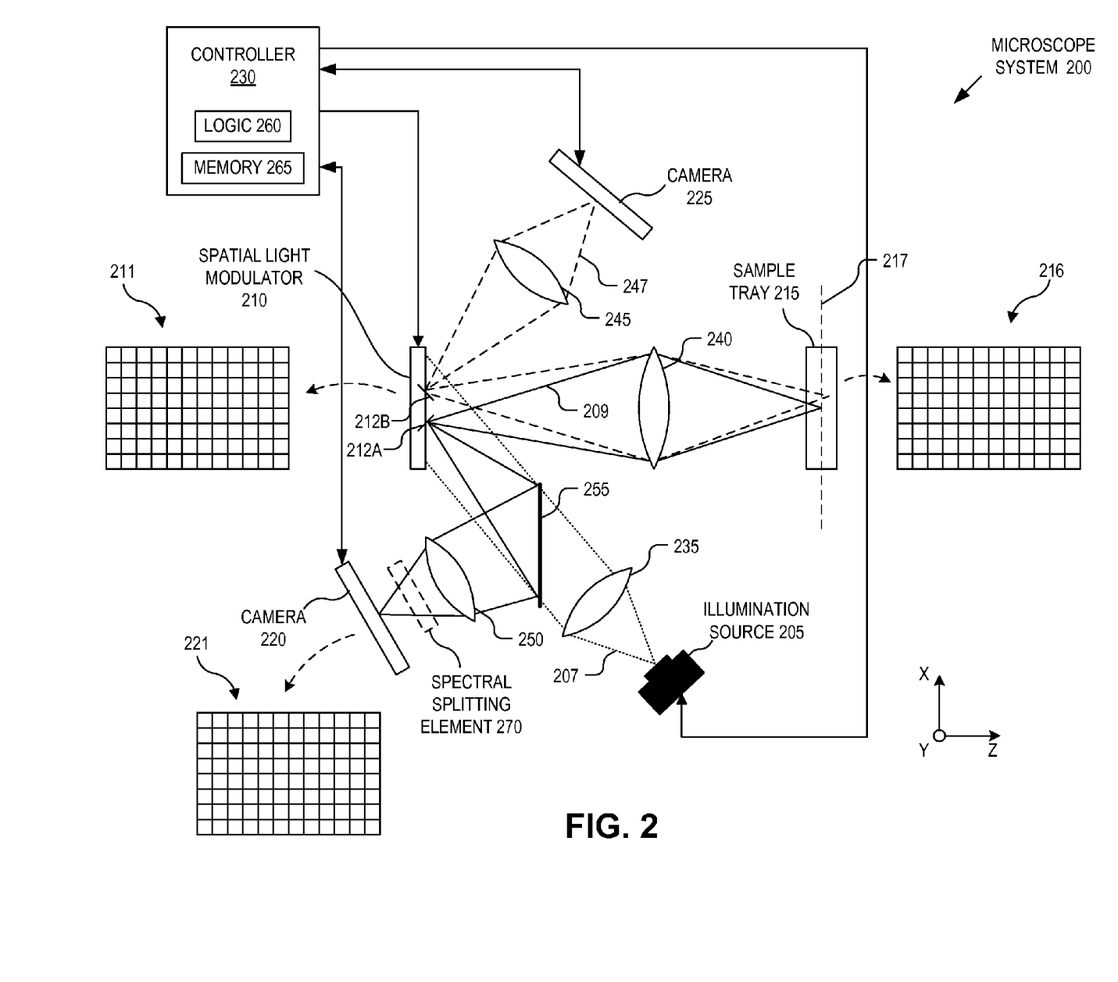
FIG. 2 is a functional block diagram illustrating a microscope system for obtaining images of samples in parallel, in accordance with an embodiment of the disclosure.

FIG. 2 is a functional block diagram illustrating a microscope system 200 for obtaining images of samples, in accordance with an embodiment of the disclosure. The illustrated embodiment of microscope system 200 includes an illumination source 205, spatial light modulator 210, a sample tray 215, cameras 220 and 225, relay optics, and controller 230. The illustrated embodiment of the relay optics includes lenses 235, 240, 245, and 250 and a beam splitter 255. The illustrated embodiment of controller 230 includes logic 260 and memory 265. In one embodiment, microscope system 200 may further include a spectral splitting element 270.

Microscope system 200 is an optical sectioning microscope system capable of acquiring three-dimensional ("3D") images over wide fields of view. Microscope system 200 using confocal techniques to achieve high resolution, diffraction-limited images of 100+ micron thick samples (e.g., biological samples) held in sample tray 215. Microscope system 200 may also be implemented as a fluorescence microscope by the inclusion of appropriate filters and the use of selective illumination wavelengths for illumination light 207.

In some embodiments, microscope system 200 includes a number of parallelized elements that facilitate obtaining images of many samples in parallel. For example, sample tray 215 may be implemented as a multi-sample tray 216 having 96 well plates each capable of holding a different sample under test. As such, the other components of microscope system 200 may also be parallelized. For example, spatial light modulator 210 may be implemented as an array 211 of spatial light modulators, each corresponding to a sample well within multi-sample tray 216. Similarly, cameras 220 and 225 may also each be implemented as an array 221 of cameras, each corresponding to a sample well within multi-sample tray 216. The relay optics may also be similarly parallelized or alternatively enlarged to have a field of view that covers the full arrays 211 and 221. In one embodiment, arrays 211 and 221 may be implemented using oversized arrays that are logically sectioned, with each section corresponding to a different sample within multi-sample tray 216.

Microscope system 200 operates using spatial light modulator 210, which includes rapidly re-programmable elements 212, which alter the wavefront of the ingoing illumination light 207 and outgoing image light 209 (backscatter light). Spatial light modulator 210 is capable of illuminating a well on sample tray 215 over a macroscopic (e.g., millimeters) field of view, while each element 212 of spatial light modulator 210 can provide pinhole illumination that is scanned and sectioned over a sample. Spatial light modulator 210 may be implemented using a digital micro-mirror device ("DMD") or liquid crystal screen and may have on the order of $10^6$ pixels or elements 212 capable of being switched at kHz speeds. This order of magnitude enables diffraction-limited operation and rapid image acquisition. Of course, in parallelized embodiments, array 211 would include $N \times 10^6$ elements 212, where N is the number of samples within sample tray 215 that can be simultaneously imaged.

In an example where spatial light modulator 210 is implemented using a DMD (illustrated), each element 212 is capable of tilting to at least two directions—an activated state illustrated by element 212A and a deactivated state illustrated by element 212B. Activated element 212A directs a pinhole illumination from illumination light 207 onto sample tray 215 and further directs a pinhole image of backscattered image light 209 to beam splitter 255 where it is reflected towards camera 220 and captured. The spatial light modulator 210 can rapidly switch elements 212 to scan across the surface of a sample and acquire a 2D set of pinhole images of the sample at camera 220. Subsequently, a position of sample tray 215 can be adjusted along the axial direction (Z-axis) to acquire another 2D set of pinhole images, referred to as a slice. The slices can then be combined into a 3D image. This procedure is further parallelized across all N samples on sample tray 215 to enable high-speed massively-parallel diagnostic screening. In other embodiments, focal plane 217 may be adjusted while sample tray 215 is held stationary to acquire each slice.

Controller 230 is coupled to at least cameras 220 and 225, spatial light modulator 210, and illumination source 205 to control their operation. Controller 230 includes logic 260 that is executed to choreograph the automation of the various functional components of microscope system 200. For example, controller 230 is coupled to spatial light modulator 210 to switch elements 212 and select spatial light modulation patterns. Spatial light modulator 210 operating under the influence of controller 230 and logic 260 is a programmable array microscope. Controller 230 is coupled to cameras 220 and 225 to acquire images and to control exposure times. Controller 230 is coupled to illumination source 205 to enable illumination light 207, and in some embodiments, to adjust its intensity or spectral constituents. In one embodiment, controller 230 is coupled to actuators for either adjusting an axial position of sample tray 215 and/or coupled to relay optics to adjust a position of focal plane 217.

In one embodiment, microscope system 200 can be operated to generate point spread function images of samples in sample tray 215. In this embodiment, a rejected light image 247 is directed towards camera 225 by elements 212B in the deactivated state. Thus, light incident upon spatial light modulator 210 around the "pinhole" generated by the activated element 212A, is not merely discarded. Rather, this rejected light has valuable information and is collected by camera 225 in a similar manner to how camera 220 collects the pinhole images. Controller 230 is coupled to both camera 220 and camera 225 to control their operation and acquire their respective images. The collected pinhole images and rejected light images are stored into memory 265 and combined to generate point spread function images that include information from both the pinhole images collected by camera 220 and the rejection light images collected by camera 225.

The relay optics serve the function of imaging focal plane 217 through sample tray 215 onto the surface of spatial light modulator 210 and further imaging the surface of spatial light modulator 210 onto cameras 220 and 225. Lenses 235, 240, 245, and 250 may be implemented as discrete refractive optical elements (or arrays of discrete refractive optical elements), diffractive optical elements, filters, or otherwise. The relay optics may include beam splitter 255 to pass a portion of illumination light 207 while redirecting a portion of pinhole image light 209 to camera 220. Beam splitter 255 may be implemented as a 50/50 beam splitter or a polarization beam splitter with a polarization rotator. The orientation of lenses 235, 240, 245, and 250 illustrated in FIG. 2 is merely a demonstrative example. The relay optics may implemented with a variety of different configurations and elements capable of imaging focal plane 217 onto spatial light modulator 210 and imaging spatial light modulator 210 onto cameras 220 and 225.

As mentioned above, spectral splitting element 270 is an optional feature, which may be used to obtain hyper-spectral images. In one embodiment, spectral splitting element 270 is a prism that spatially separates different wavelengths and maps wavelength to pixel position on camera 220. The scanned pinhole images of a given slice can then be collated to obtain hyper-spectral images.

Figure 3:
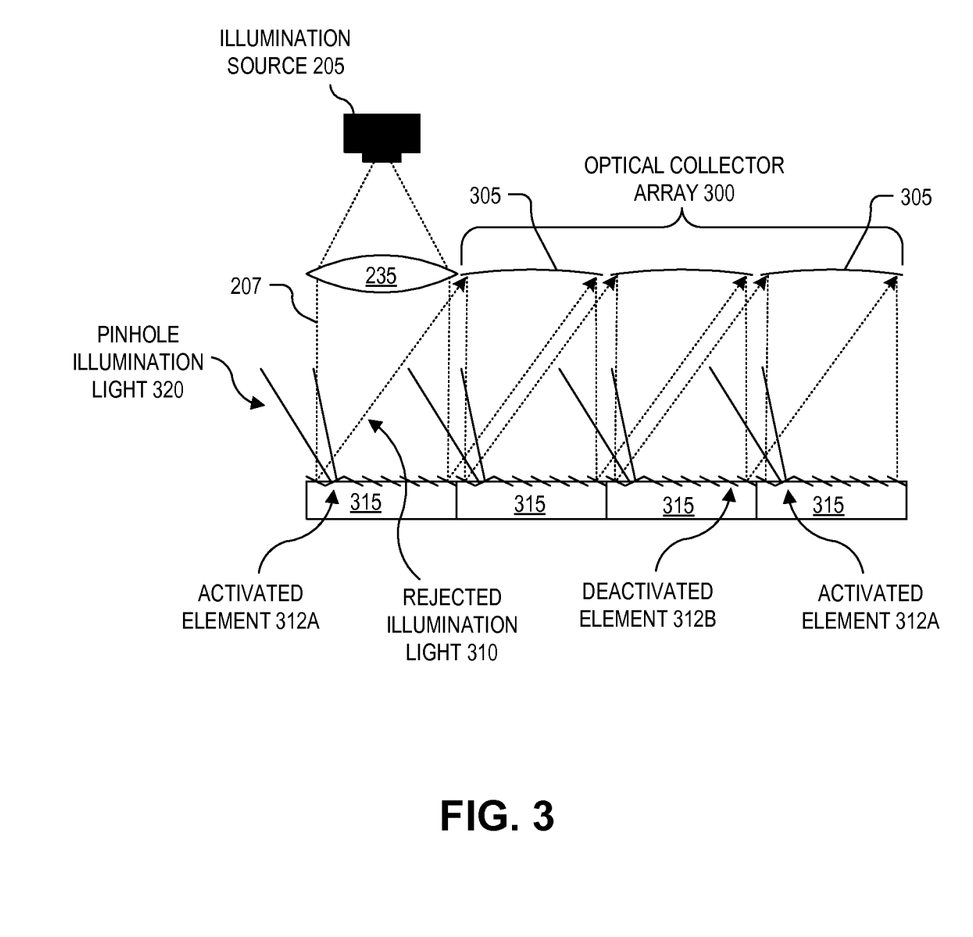
FIG. 3 illustrates an optical collector array for serially recycling illumination light over a plurality of spatial light modulators, in accordance with an embodiment of the disclosure.

FIG. 3 illustrates an optical collector array 300 for serially recycling illumination light over a plurality of spatial light modulators, in accordance with an embodiment of the disclosure. Optical collector array 300 is one possible embodiment for illuminating array 211 of spatial light modulators.

Optical collector array 300 includes a series of reflectors 305 positioned to reflect rejected illumination light 310 from one spatial light modulator 315 to the next. Spatial light modulators 315 are operated to provide a pinhole like function, which means only a small fraction of elements 312 are activated (e.g., activated elements 312A) at a given instant and a majority of elements 312 are deactivated (e.g., deactivated elements 312B). The activated elements 312A redirect the incident illumination light as pinhole illumination light 320, which is focused onto a corresponding sample in sample tray 215. The deactivated elements 312A redirect the light to optical collector array 300 where it is reflected back to the next spatial light modulator 315 to recycle rejected illumination light 310 in a serial fashion to the next inline spatial light modulator 315. Thus, illumination source 205 need only illuminate one spatial light modulator within array 211 and the bulk of the incident illumination light 207 that would otherwise be discharged is recycled over the array 211. Reflectors 305 may be simple reflectors or may be curved reflective surfaces with focusing power.

Figure 4:
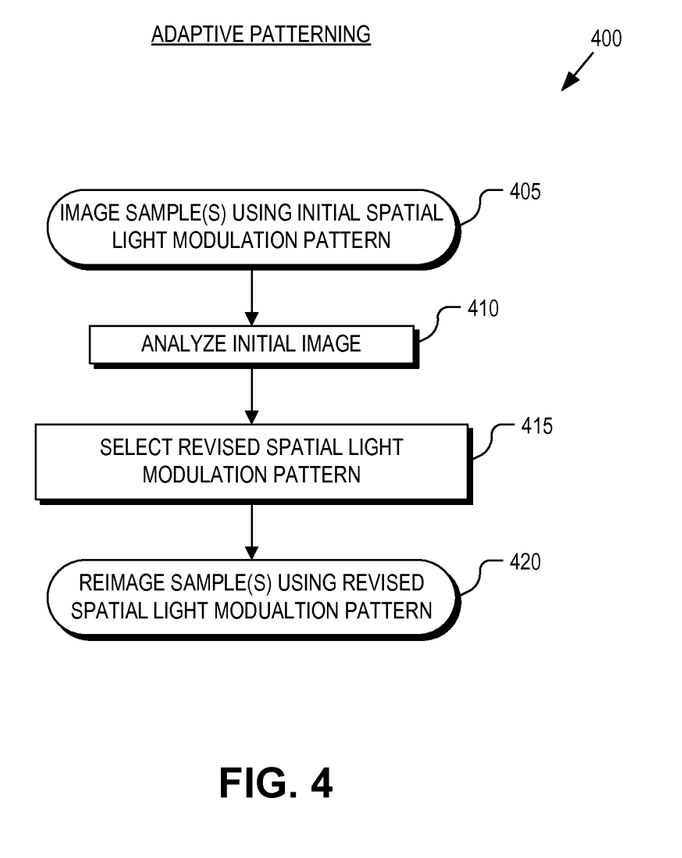
FIG. 4 is a flow chart illustrating a process for adaptive patterning when imaging samples using spatial light modulators to acquire pinhole images of the samples, in accordance with an embodiment of the disclosure.

FIG. 4 is a flow chart illustrating a process 400 for adaptive patterning when imaging samples with microscope system 200, in accordance with an embodiment of the disclosure. Process 400 is described with reference to FIG. 5A-5E. The order in which some or all of the process blocks appear in process 400 should not be deemed limiting. Rather, one of ordinary skill in the art having the benefit of the present disclosure will understand that some of the process blocks may be executed in a variety of orders not illustrated, or even in parallel.

In a process block 405, initial images of samples are acquired using an initial spatial light modulation pattern. FIGS. 5A to 5E illustrate various examples of spatial light modulation patterns, which can be programmed into spatial light modulator 210. The dark pixels correspond to activated elements 212A while the white pixels correspond to deactivated elements 212B. An initial modulation pattern may be a sparse pattern that can be scanned across quickly, with large pinhole groups that pass more light to enable quick integration times for each pinhole image. For example, FIG. 5E may represent a suitable initial spatial light modulation pattern with pinhole groups 505 including many elements 212A and the picture frame consists of fewer overall pinhole groups through which to scan.

Figure 5A:
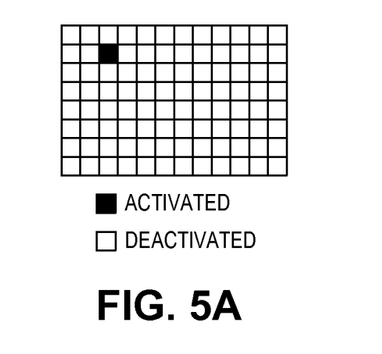
FIG. 5A-E illustrate various spatial light modulation patterns, in accordance with an embodiment of the disclosure.
Figure 5B:
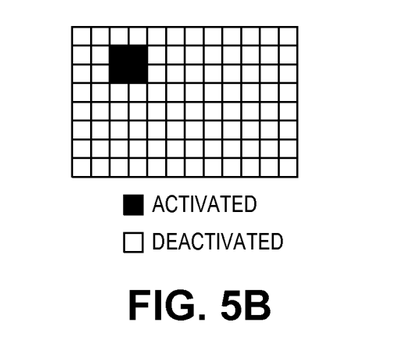
Figure 5C:
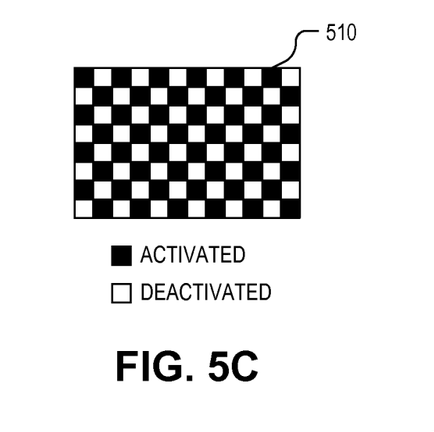
Figure 5D:
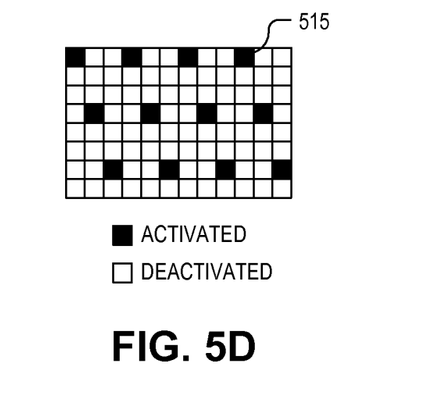
Figure 5E:
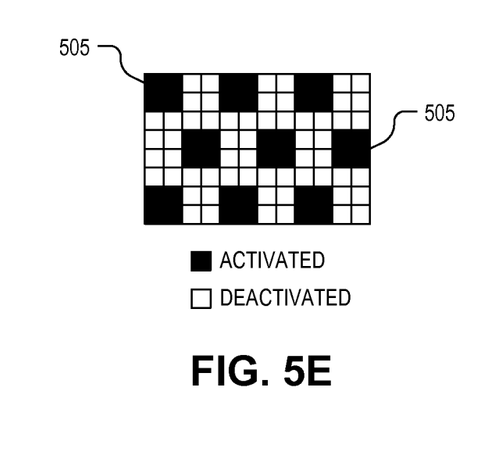

In a process block 410, the initial images of the samples are analyzed. Based upon characteristics of the initial images, each spatial light modulator 210 within array 211 may be programmed with a new (and potentially individually different) spatial light modulation pattern (process block 415). The revised spatial light modulation patterns may be selected from a fixed database of patterns stored in memory 265. Sample characteristics that may impact pattern selection include sparsity of reflective/fluorescent particles in a given sample, size of particles being imaged, image resolution desired, imaging time constraints, etc. For example, spatial resolution may be increased if the particles are small or imaging time is not constrained. In this case, the spatial light modulation pattern illustrated in FIG. 5C having a dense pattern of small pinholes 510 may be selected. If the particles are densely packed within the sample, then the sparsely spaced pinholes 515 of the spatial light modulation pattern illustrated in FIG. 5D may be selected. Accordingly, the initial images may be used to select the size of each pinhole in a pattern (e.g., small pinholes as illustrated in FIG. 5A vs large pinholes as illustrated in FIG. 5B) as well as the sampling pattern of the pinholes in spatial light modulation pattern (e.g., a dense pattern as illustrated in FIG. 5C or a sparse pattern as illustrated in FIG. 5D). The revised spatial modulation patterns may also include adjustments to pinhole exposure times or duty cycles. In a process block 420, the samples are reimaged using the revised spatial light modulation patterns.

Figure 5F:
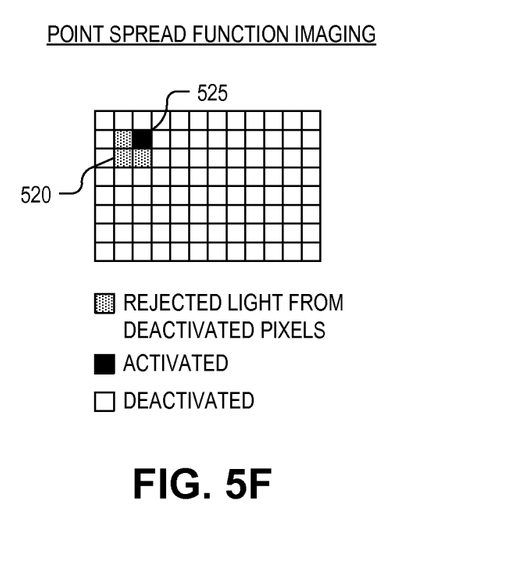
FIG. 5F illustrates point spread function imaging by combining pinhole images with rejected light images, in accordance with an embodiment of the disclosure.

FIG. 5F illustrates point spread function imaging by combining pinhole images with rejected light images, in accordance with an embodiment of the disclosure. As mentioned above, microscope system 200 can be operated to generate point spread function images of samples in sample tray 215. These images are created by combining rejected light images acquired by camera 225 within pinhole images acquired by camera 220. The rejected light images are reflected by deactivated pixel elements 520 while the pinhole images are reflected by activated pixel elements 525. Peripheral light incident around the pinholes created by activated elements is typically discarded by confocal microscopes. However, this light can have useful information if combined using point spread function imaging techniques. Accordingly, camera 225 and deactivated pixel elements are used to acquire this peripheral light data.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible machine-readable storage medium includes any mechanism that provides (i.e., stores) information in a non-transitory form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A microscope system, comprising:
    a sample tray including a plurality of sample wells to hold a plurality of samples to be imaged in parallel;
    an illumination source to generate illumination light;
    a plurality of spatial light modulators each positioned to spatially modulate the illumination light onto a corresponding one of the samples, wherein each of the spatial light modulators corresponds to one of a plurality of logical sections of an oversized spatial light modulator and wherein each of the logical sections corresponds to one of the sample wells;
    relay optics positioned in an optical path between the sample tray and the plurality of spatial light modulators to image the samples onto the plurality of spatial light modulators, wherein the relay optics are coupled to direct an image of a given one of the samples to a corresponding one of the logical sections of the oversized spatial light modulator; and
    a plurality of first cameras positioned to capture images in parallel of the samples in the sample tray by imaging the plurality of spatial light modulators.

2. The microscope system of claim 1, wherein each of the spatial light modulators is configured to perform programmable pinhole spatial filtering on the illumination light to point illuminate a corresponding one of the samples.

3. The microscope system of claim 2, wherein each of the spatial light modulators comprises one of a digital micromirror device or a liquid crystal pixel array.

4. The microscope system of claim 2, wherein the first cameras are positioned to capture pinhole images of the samples at a given instant from activated portions of the spatial light modulators.

5. The microscope system of claim 4, further comprising:
a plurality of second cameras positioned to capture rejected light images of the samples by imaging the plurality of spatial light modulators, wherein the rejected light images are directed to the second cameras by deactivated portions of the plurality of spatial light modulators.

6. The microscope system of claim 5, further comprising:
a controller coupled to combine the rejected light images with the pinhole images to generate point spread function images of the samples.

7. The microscope system of claim 1, wherein the illumination source is positioned to directly illuminate a first one of the spatial light modulators, the microscope system further comprising:
an optical collector array positioned to collect rejected illumination light from the spatial light modulators and serially recycle the rejected illumination light to illuminate the spatial light modulators not directly illuminated by the illumination source.

8. The microscope system of claim 1, further comprising:
a controller coupled to the spatial light modulators and to the first cameras, wherein the controller includes adaptive patterning logic, which when executed by the controller causes the microscope system to perform operations, including:
acquiring initial images of the samples based upon an initial spatial light modulation pattern to be applied to the spatial light modulators when acquiring the initial images;
analyzing the initial images;
selecting revised spatial light modulation patterns to be applied to the spatial light modulators based upon the analyzing; and
re-imaging the samples using the revised spatial light modulation patterns.

9. The microscope system of claim 8, wherein the revised spatial light modulation patterns adjust one or more of a pinhole size generated by the spatial light modulators, a pinhole sampling pattern generated by the spatial light modulators, or pinhole exposure times used by the spatial light modulators.

10. The microscope system of claim 1, further comprising:
one or more spectral splitting elements positioned between the spatial light modulators and the first cameras to map wavelengths to pixel positions on the first cameras to acquire hyper-spectral images of the samples in parallel.

11. A microscope system, comprising:
a sample tray to hold a sample to be imaged;
an illumination source to generate illumination light;
a spatial light modulator positioned to spatially modulate the illumination light onto the sample, wherein the spatial light modulator is configured to perform programmable pinhole spatial filtering on the illumination light to point illuminate the sample;
relay optics positioned in an optical path between the sample tray and the spatial light modulator to image the sample onto the spatial light modulator;
a first camera positioned to capture an image of the sample in the sample tray by imaging the spatial light modulator, wherein the first camera captures pinhole images of the sample;
a controller coupled to the spatial light modulator and to the first camera, wherein the controller includes adaptive patterning logic, which when executed by the controller causes the microscope system to perform operations, including:
acquiring an initial image of the sample based upon an initial spatial light modulation pattern to be applied to the spatial light modulator when acquiring the initial image;
analyzing the initial image;
selecting a revised spatial light modulation pattern to be applied to the spatial light modulator based upon the analyzing; and
re-imaging the sample using the revised spatial light modulation pattern.

12. The microscope system of claim 11, further comprising:
a second camera positioned to capture rejected light images of the sample by imaging the spatial light modulator, wherein the rejected light images are directed to the second camera by deactivated portions of the spatial light modulator.

13. The microscope system of claim 12, further comprising:
a controller coupled to combine the rejected light images with the pinhole images to generate point spread function images of the sample.

14. The microscope system of claim 11, wherein the revised spatial light modulation pattern adjusts one or more of a pinhole size generated by the spatial light modulator, a pinhole sampling pattern generated by the spatial light modulator, or pinhole exposure times used by the spatial light modulator.

15. At least one machine-accessible storage medium that provides instructions that, when executed by a microscope system, will cause the microscope system to perform operations comprising:
spatially modulating illumination light onto a plurality of samples held on a sample tray using a plurality of spatial light modulators;
imaging the samples onto the spatial light modulators using relay optics;
capturing, in parallel, images of the samples with a plurality of first cameras focused to image the plurality of spatial light modulators;
acquiring initial images of the samples based upon an initial spatial light modulation pattern applied to the spatial light modulators when acquiring the initial images;
analyzing the initial images;
selecting revised spatial light modulation patterns to apply to the spatial light modulators based upon the analyzing; and
re-imaging the samples using the revised spatial light modulation patterns.

16. The at least one machine-accessible storage medium of claim 15, wherein spatially modulating illumination light comprises performing pinhole spatial filtering on the illumination light to point illuminate the samples, and wherein capturing the images of the samples comprises capturing pinhole images of the samples from activated portion of the spatial light modulators.

17. The at least one machine-accessible storage medium of claim 16, further providing instructions that, when executed by the microscope system, will cause the microscope system to perform further operations, comprising:
   capturing rejected light images of the samples with a plurality of second cameras focused to image the plurality of spatial light modulators, wherein the rejected light images are directed to the plurality of second cameras by deactivated portions of the plurality of spatial light modulators.

18. The at least one machine-accessible storage medium of claim 17, further providing instructions that, when executed by the microscope system, will cause the microscope system to perform further operations, comprising:
   combine the rejected light images with the pinhole images to generate point spread function images of the samples.

19. The at least one machine-accessible storage medium of claim 15, wherein the revised spatial light modulation patterns adjust one or more of a pinhole size generated by the spatial light modulators, a pinhole sampling pattern generated by the spatial light modulators, or pinhole exposure times used by the spatial light modulators.

* * * * *